United States Patent
Tsuchida (10) Patent No.: US 8,652,673 B2
(45) Date of Patent: Feb. 18, 2014

(54) SOLID LITHIUM SECONDARY CELL, AND PRODUCTION METHOD THEREFOR

(71) Applicant: Yasushi Tsuchida, Susono (JP)

(72) Inventor: Yasushi Tsuchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/657,180

(22) Filed: Oct. 22, 2012

(65) Prior Publication Data

US 2013/0065123 A1    Mar. 14, 2013

Related U.S. Application Data

(62) Division of application No. 12/385,851, filed on Apr. 22, 2009, now abandoned.

(30) Foreign Application Priority Data

Apr. 24, 2008   (JP) .................................. 2008-114360

(51) Int. Cl.
    *H01M 4/36*   (2006.01)
(52) U.S. Cl.
    USPC ..................... 429/104; 429/304; 429/231.95
(58) Field of Classification Search
    USPC ......... 429/104, 133, 168, 170, 172, 304, 322, 429/231.95
    See application file for complete search history.

(56) References Cited

U.S. PATENT DOCUMENTS

| 5,004,657 A | * | 4/1991 | Yoneda et al. ................ 429/304 |
| 2007/0218367 A1 | | 9/2007 | Yamaguchi et al. |

FOREIGN PATENT DOCUMENTS

| JP | A-64-71068 | 3/1989 | |
| JP | A-5-13102 | 1/1993 | |
| JP | 09035724 A | * 2/1997 | ............. H01M 6/18 |
| JP | 09035724 A | * 2/1997 | ............. H01M 8/18 |
| JP | A-9-35724 | 2/1997 | |
| JP | A-11-97072 | 4/1999 | |
| JP | A-2001-155763 | 6/2001 | |
| JP | A-2003-168416 | 6/2003 | |

* cited by examiner

*Primary Examiner* — Patrick Ryan
*Assistant Examiner* — Ben Lewis
(74) *Attorney, Agent, or Firm* — Oliff PLC (57) ABSTRACT

A solid electrolyte layer and electrode layers are formed within an electrically insulating frame part, and current collecting plates are held by the electrically insulating frame part. Since the current collecting plates are held by the frame part, the shifting or coming-apart of the current collecting plates can be restrained. In order to cause the current collecting plates to be held by the frame part, a powder of material of the electrode layer is filled in between the frame part and the current collecting plates.

6 Claims, 4 Drawing Sheets

SOLID LITHIUM SECONDARY CELL, AND PRODUCTION METHOD THEREFOR

This is a Division of application Ser. No. 12/385,851 filed Apr. 22, 2009, which claims the benefit of Japanese Application No. 2008-144360 filed Apr. 24, 2008. The disclosure of the prior applications is hereby incorporated by reference herein in its entirety.

INCORPORATION BY REFERENCE

The disclosure of Japanese Patent Application No. 2008-114360 filed on Apr. 24, 2008 including the specification, drawings and abstract is incorporated herein by reference in its entirety.

BACKGROUND OF THE INVENTION

1. Field of the Invention

This invention relates to a solid-type lithium secondary cell, and a production method for the solid-type lithium secondary cell.

2. Description of the Related Art

Lithium secondary cells are high in energy density, and are capable of outputting high voltage, and are therefore expected as power sources of batteries of electric motor vehicles, hybrid motor vehicles, etc., or as power sources of portable electric appliances such as notebook personal computers, cellular phones, etc. Among lithium secondary cells, a solid lithium secondary cell that employs a solid electrolyte instead of a liquid electrolyte has recently been proposed. The solid lithium secondary cell is considered excellent in safety and productivity, and is expected as a future secondary cell. The solid lithium secondary cell has a structure in which a positive electrode layer, a solid electrolyte layer, and a negative electrode layer are layered in that order, and current collecting plates are attached to both sides of the layered unit. Generally, the solid lithium secondary cell is formed by a powder molding method. Specifically, a positive electrode material, an electrolyte material and a negative electrode material are placed in a mold, and are pressed to make a pellet in which electrode layers and electrolyte layer form a layered structure (hereinafter, sometimes referred to as "electrolyte-electrode layered assembly"). After the pellet is removed from the mold, current collecting plates are attached thereto, whereby a cell is produced.

In the case where a solid lithium secondary cell is produced in the foregoing manner, when the pellet is removed from the mold, a side surface of the pellet rubs on an internal surface of the mold, so that electrode material adheres to a side surface of the electrolyte layer, giving rise to a problem of internal short-circuit of the cell. To overcome this problem, a solid lithium secondary cell in which an electrically insulating frame part is employed, and electrode layers and an electrolyte layer are integrally formed within the frame part has been proposed (see Japanese Patent Application Publication No. 9-35724 (JP-A-9-35724)). According to this solid lithium secondary cell, the rubbing of a side surface of the pellet does not occur, and therefore the internal short circuit of the cell can be prevented. Incidentally, in order to produce a cell, it is necessary to attach current collecting plates to a layered assembly made up of a positive electrode layer, an electrolyte layer, and a negative electrode layer as described above. If a current collecting plate falls apart from the electrolyte-electrode layered assembly, or the adhesion area between a current collecting plate and the electrode layer decreases, problems of productivity reduction, contact resistance increase, etc. can occur. Therefore, it is necessary to devise some measures in order to fix the electrolyte-electrode layered assembly and the current collecting plates.

SUMMARY OF THE INVENTION

The invention provides a solid lithium secondary cell that employs an electrically insulating frame part and that is capable of restraining the coming-apart of a current-collecting member from the electrolyte-electrode layered assembly or reduction of the contact area of a current-collecting member with the electrode layer (hereinafter, referred to as "the coming-apart or the like"), and also provides a production method for the solid lithium secondary cell.

A first aspect of the invention is a solid lithium secondary cell that includes: an electrically insulating tubular insulating frame; a solid electrolyte layer formed within the insulating frame; an electrode layer that is layered on at least one of surfaces of the solid electrolyte layer, and that is formed within the insulating frame; and a current-collecting member that is layered on the electrode layer, and that is held by the insulating frame.

A second aspect of the invention is a production method for a solid lithium secondary cell that includes: an electrically insulating tubular insulating frame; a solid electrolyte layer formed within the insulating frame; an electrode layer that is layered on at least one of surfaces of the solid electrolyte layer, and that is formed within the insulating frame by pressing a powder of a material of the electrode layer; and a current-collecting member that is layered on the electrode layer, at least a portion of the current-collecting member being disposed within the insulating frame, the production method including the step of pressing the material of the electrode layer by applying force to the current-collecting member. In this step, when the material is pressed, pressing is performed so that the current-collecting member moves relative to the insulating frame.

A third aspect of the invention is a production method for a solid lithium secondary cell, the production method including: the step of making an electrolyte-electrode layered assembly that has a layered structure that includes an electrode layer and a solid electrolyte layer, by placing a powder of a material of the electrode layer, and a powder of a material of the solid electrolyte layer, in an electrically insulating tubular insulating frame, and tentatively pressing the powder of the material of the electrode layer, and the powder of the material of the solid electrolyte layer; the step of layering the current-collecting member on the electrolyte-electrode layered assembly so that at least a portion of the current-collecting member is disposed within the insulating frame; and the step of definitively pressing the electrolyte-electrode layered assembly on which the current-collecting member has been layered, in such a manner that the current-collecting member moves relative to the insulating frame.

A fourth aspect of the invention is a production method for a solid lithium secondary cell that includes: an electrically insulating tubular insulating frame; a solid electrolyte layer formed within the insulating frame; an electrode layer that is layered on at least one of surfaces of the solid electrolyte layer, and that is formed within the insulating frame by pressing a powder of a material of the electrode layer; and a current-collecting member that is layered on the electrode layer, at least a portion of the current-collecting member being disposed within the insulating frame. The production method includes the step of pressing the material of the electrode layer by applying force to the current-collecting member. In this step, when the material is pressed, pressing is performed so that the material of the electrode layer gets in between the insulating frame and an outer periphery of the current-collecting member as a layer of the powder of the material of the electrode layer plastically deforms.

A fifth aspect of the invention is a production method for a solid lithium secondary cell which includes: the step of making an electrolyte-electrode layered assembly that has a layered structure that includes an electrode layer, and a solid electrolyte layer, by placing a powder of a material of the electrode layer, and a powder of a material of the solid electrolyte layer, in an electrically insulating tubular insulating frame, and tentatively pressing the powder for the electrode layer, and the powder for the solid electrolyte layer; the step of layering the current-collecting member on the electrolyte-electrode layered assembly so that at least a portion of the current-collecting member is disposed within the insulating frame; and the step of definitively pressing the electrolyte-electrode layered assembly on which the current-collecting member has been layered, in such a manner that the material of the electrode layer gets in between the insulating frame and an outer periphery of the current-collecting member as the electrode layer plastically deforms.

According to the first aspect of the invention, since the current-collecting member is hold by the frame part, the coming-apart or the like of the current-collecting member can be restrained.

Besides, the first aspect of the invention, a space between the frame part and the current-collecting member is filled with the powder of the material of the electrode layer. Therefore, by the elastic force of the powder, the current-collecting member is fixed to the insulating frame. Hence, the coming-apart or the like of the current-collecting member can be effectively prevented. That is, in this invention, the current-collecting member is held indirectly by the insulating frame, via the powder of the electrode material.

Besides, according to the first aspect of the invention, a gap into which the powder of the electrode material moves is formed between the frame part and the current-collecting member, and the current-collecting member is held by the elastic force of the powder that fills the gap.

According to the second to fourth aspects of the invention, when the definitive pressing is performed, the powder of the electrode material gets in between the current-collecting member and the frame part. Hence, a solid lithium secondary cell in which the current-collecting member is held by the frame part via the elastic force of the powder can be produced.

According to the fifth aspect of the invention, since a gap into which the powder of the electrode material moves is formed between the frame part and the current-collecting member, the powder of the electrode material is more certainly forced to get in between the frame part and the current-collecting member.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Hereinafter, embodiments of the invention will be described with reference to the drawings.

Figure 1:
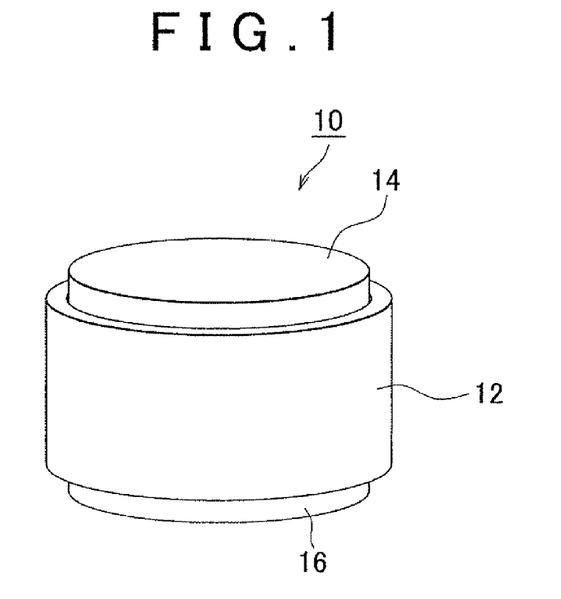
FIG. 1 is a perspective view of a solid cell of Embodiment 1 of the invention.

FIG. 1 is a perspective view of a solid lithium secondary cell of Embodiment 1 of the invention. As shown in FIG. 1, the solid lithium secondary cell 10 according to this embodiment is equipped with an electrically insulating frame part 12 (hereinafter, termed the insulating frame 12). The insulating frame 12 is provided so as to entirely cover side surfaces of an electrolyte layer, a positive electrode layer, and a negative electrode layer of the solid lithium secondary cell 10, and so as to partially cover a side surface of a negative electrode current collecting plate 14, and a side surface of a positive electrode current collecting plate 16 of the solid lithium secondary cell 10.

Figure 2:
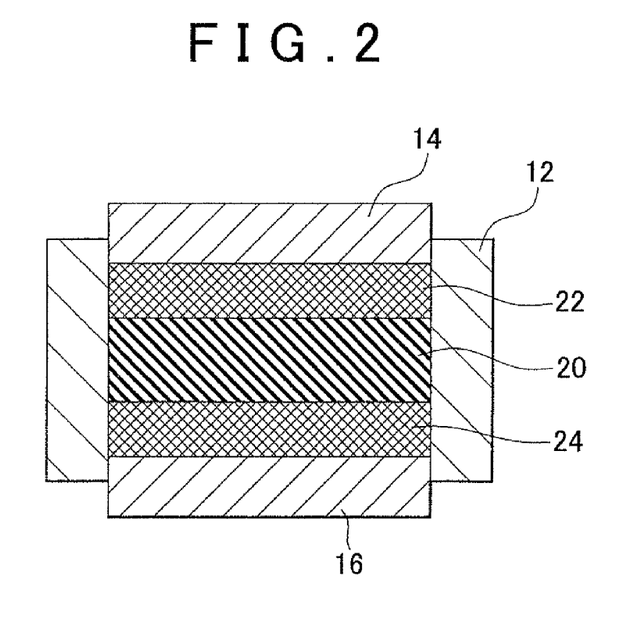
FIG. 2 is a sectional view of the solid cell of Embodiment 1.

FIG. 2 is a sectional view of the solid lithium secondary cell 10 of Embodiment 1. As shown in FIG. 2, the lithium secondary cell 10 has a structure in which the current collecting plates 14 and 16 are attached to a layered assembly (electrolyte-electrode layered assembly) made up of an electrolyte layer 20, a negative electrode layer 22, and a positive electrode layer 24 (which, hereinafter, will sometimes be referred to collectively as "electrode layers"). The insulating frame 12 is disposed so as to entirely cover the side surfaces of the electrolyte layer 20, and the electrode layers 22 and 24, and so as to partially cover the side surfaces of the current collecting plates 14 and 16. The electrolyte layer and the electrode layers are all made of solid substances, and are formed by pressing raw-material powders.

In this embodiment, the material of the electrolyte layer is $70Li_2S-30P_2S_5$, and the material of the positive electrode layer is a mixture of $70Li_2S-30P_2S_5$, the material of the electrolyte layer, and $LiCoO_2$, which is a positive electrode active material, and the material of the negative electrode layer is a mixture of $70Li_2S-30P_2S_5$, the material of the electrolyte layer, and graphite, which is a negative electrode active material. In this embodiment, $70Li_2S-30P_2S_5$ is used in the form of a powder having an average particle diameter of 20 micrometers, and $LiCoO_2$ is used in the form of a powder having an average particle diameter of 10 micrometers, and graphite is used in the form of a powder having an average particle diameter of 10 micrometers. Besides, the insulating frame is constructed of an electrically insulating resin. Besides, the current collecting plate is a thin plate made of a stainless steel and having a thickness of 300 micrometers.

Figure 3:
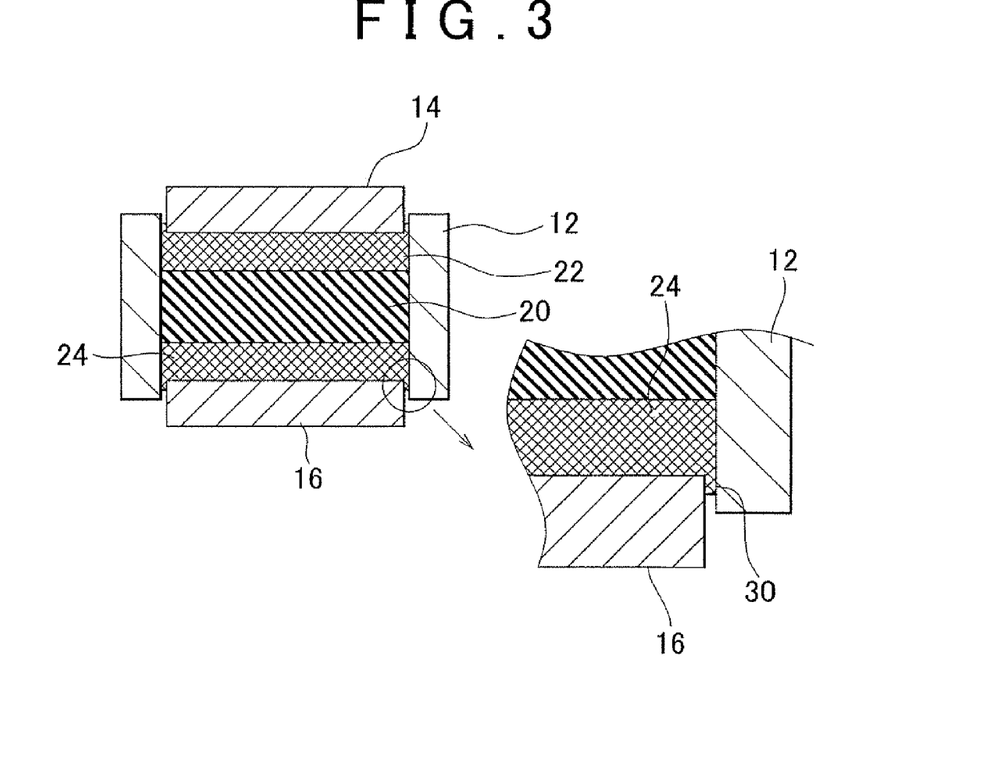
FIG. 3 is a sectional view and a partial enlarged view of the solid cell of Embodiment 1.

FIG. 3 is a sectional view and a partial enlarged view of the solid lithium secondary cell 10 of this embodiment. As shown in FIG. 3, a gap 30 between the insulating frame 12 and the side surface of the positive electrode current collecting plate 16 in the solid lithium secondary cell 10 of this embodiment is filled with a material that constitutes the positive electrode layer 24 (i.e., the positive electrode active material or the material of the electrolyte layer). Likewise, a gap between the insulating frame 12 and the negative electrode current collecting plate 14 is filled with a material that constitutes the negative electrode layer 22 (i.e., the negative electrode active material or the material of the electrolyte layer).

In this embodiment, the gap 30 is set so that the width thereof, that is, the gap size, is 150 micrometers. Specifically, the sizes of the insulating frame 12 and the positive electrode current collecting plate 16 are determined so that the difference between the inside diameter of the insulating frame 12 and the outside diameter of the positive electrode current collecting plate 16 is 300 micrometers. Likewise, the size of the negative electrode current collecting plate 14 is determined so that the difference between the inside diameter of the insulating frame 12 and the outside diameter of the negative electrode current collecting plate 14 is 300 micrometers. The gaps 30 between the insulating frame 12 and the current collecting plates 14 and 16 formed in this manner are filled with the materials of the electrode layers 22 and 24, respectively, as described above. In the solid lithium secondary cell 10 of this embodiment, the current collecting plates 14 and 16 are held by the elastic force of the electrode materials that fills the gaps between the insulating frame 12 and the current collecting plates 14 and 16, and are fixed to the insulating frame 12. This means, from another point of view, that the insulating frame 12 supports the current collecting plates 14 and 16 via the electrode materials. Besides, it can also be considered that the current collecting plate is fixed to the insulating frame by the elastic force of the electrode materials.

Figure 4:
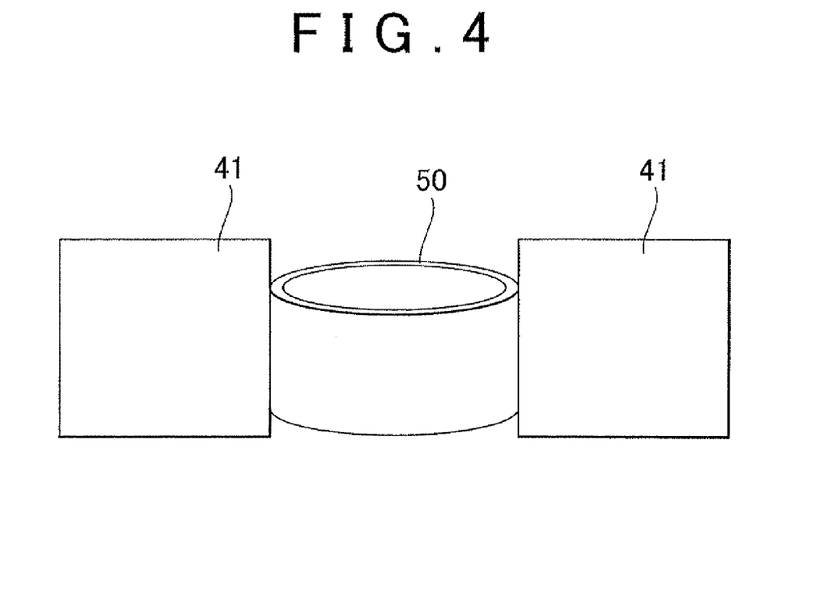
FIG. 4 is a diagram for describing a production method for the solid cell of the Embodiment 1.

With reference to FIG. 4 to FIG. 7, an example of a production method for the solid lithium secondary cell of the embodiment will be described. As shown in FIG. 4, an insulating frame 50 is firstly set in a press apparatus 41 for cell production.

Figure 5:
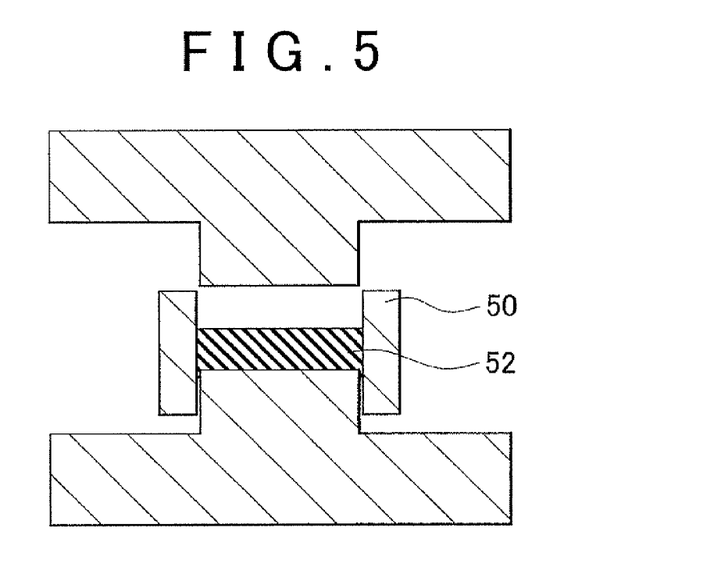
FIG. 5 is a diagram for describing the production method for the solid cell of Embodiment 1.
Figure 6:
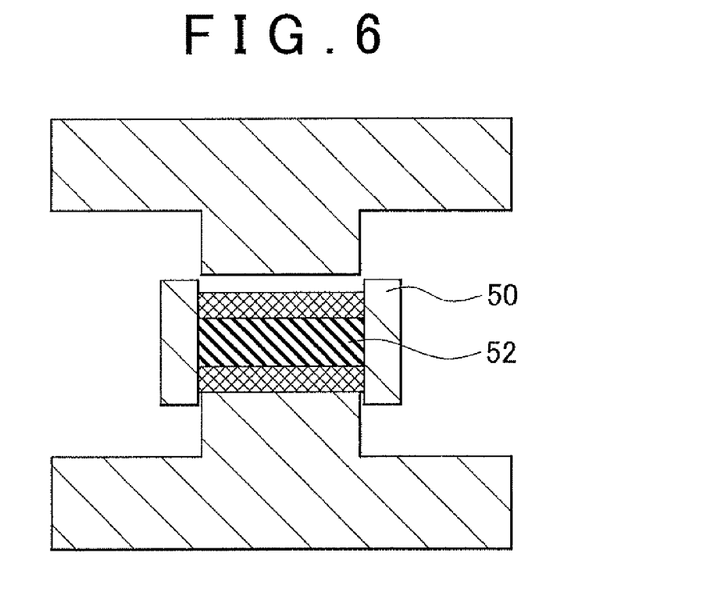
FIG. 6 is a diagram for describing the production method for the solid cell of Embodiment 1.

Next, as shown in FIG. 5, $70Li_2S$-$30P_2S_5$, which is the electrolyte material, is placed in the insulating frame 50, and tentative pressing is performed to form an electrolyte layer 52. Then, as shown in FIG. 6, a mixed material of $LiCoO_2$, which is a positive electrode active material, and $70Li_2S$-$30P_2S_5$, which is the electrolyte material, is layered on one of the two sides of the electrolyte layer 52, and a mixed material of graphite, which is the negative electrode active material, and $70Li_2S$-$30P_2S_5$, which is the electrolyte material, is layered on the other side of the electrolyte layer 52, and then tentative pressing is performed. By the tentative pressing in this manner, a layered assembly of a positive electrode layer, an electrolyte layer and a negative electrode layer (an electrolyte-electrode layered assembly) is formed in the insulating frame 50. At this time, the tentative pressing pressure is set so that the electrode layers will each be compressed by about 100 micrometers by a definitive pressing (described later).

Figure 7:
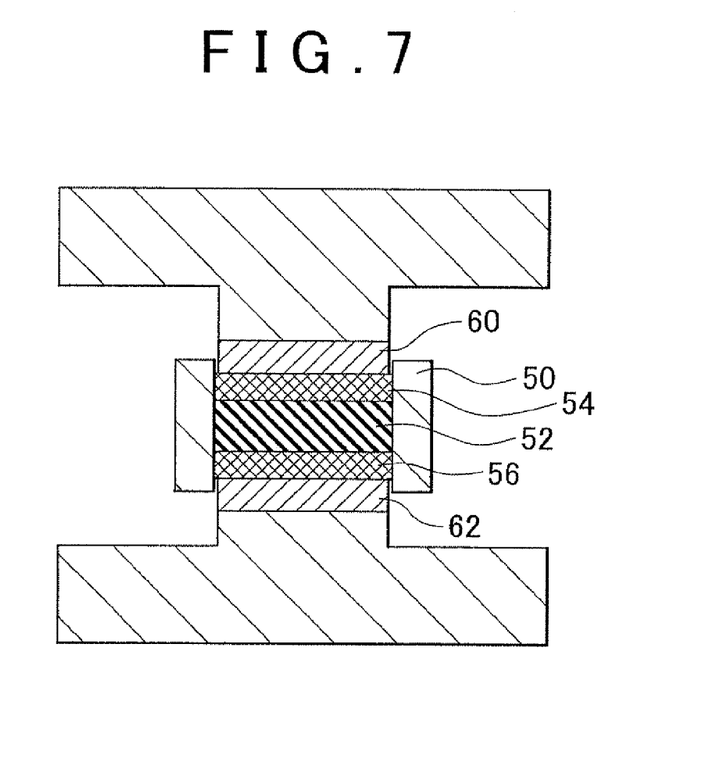
FIG. 7 is a diagram for describing the production method for the solid cell of Embodiment 1.

Next, as shown in FIG. 7, current collecting plates are attached to both sides of the electrolyte-electrode layered assembly. With the current collecting plates attached to both sides of the electrolyte-electrode layered assembly, pressing (definitive pressing) is performed by applying force to the current collecting plate on both sides. The pressing is performed by applying a force of 5 tons per square centimeter from both sides of the layered assembly. The pressing herein is performed so that the current collecting plates 60 and 62 move relative to the insulating frame 50. Specifically, the pressing is performed so that each of the current collecting plates 60 and 62 moves to the electrolyte layer 52 within the insulating frame 50.

When the pressing is performed so that the current collecting plates move relative to the insulating frame as described above, the electrode layers plastically deform so that the materials of the electrode layers enter the gaps between the insulating frame 50 and the current collecting plates 60 and 62. In other words, as the current collecting plates are displaced so as to sink into the electrode layers while compressing the electrode layers, the materials of the electrode layers are forced to fill the gaps between the insulating frame 50 and the current collecting plates 60 and 62. Then, the current collecting plates are held by the elastic force of the materials of the electrode layers. In this embodiment, the definitive pressing is performed so that each of the current collecting plates having a thickness of 300 micrometers moves a distance of 100 micrometers. In this manner, the materials of the electrode layers are forced to get in between the insulating frame and the side surfaces of the current collecting plates.

According to the solid lithium secondary cell of this embodiment, since the current collecting plate is held by the insulating frame, the coming-apart of the current collecting plates or the like is restrained. The coming-apart of a current collecting plate during production lowers the productivity, and the coming-apart thereof after production makes the charging and discharging difficult. However, according to the solid lithium secondary cell of this embodiment, these troubles can be restrained since the coming-apart of a current collecting plate can be restrained. Besides, if the contact pressure or the contact area between the electrode layer and the current collecting plates declines although the coming-apart of a current collecting plate does not occur, the contact resistance increases. According to the all-solid lithium secondary cell of the invention, since movement of the current collecting plates relative to the insulating frame can be restrained, the weakening of the contact between the electrode layer and the current collecting plates can also be restrained.

Besides, according to the solid lithium secondary cell of this embodiment, the sizes of the insulating frame and the current collecting plates are determined so that the difference between the inside diameter of the insulating frame and the outside diameter of the current collecting plates is 300 micrometers. As described above, since the average particle diameter of the materials of the electrodes used in this embodiment is 10 to 20 micrometers, sufficient amounts of the electrode materials to hold the current collecting plates can be forced into the gaps between the insulating frame and the side surfaces of the current collecting plates if the size of the gaps is about 150 micrometers. Therefore, the current collecting plates are held by the elastic force of the electrode materials forced to fill the gaps between the insulating frame and the current collecting plates.

Besides, since the electrode materials fill the gaps between the insulating frame and the current collecting plates, the electrode materials present in the electrode layer does not contact the external air. Generally, the electrode layers are high in reactivity, and are therefore likely to deteriorate when in contact with the external air. According to this embodiment, however, the electrode layers do not undergo deterioration since the electrode layers do not contact the electrode layer. In addition, it can be conceivable to use a seal material or the like in order to secure air-tightness. However, since the electrode layers are high in reactivity as described above, the contact of the electrode layers with a kind of resin or the like that is different from the electrode materials give rise to a risk of an unexpected reaction. In this embodiment, however, since air-tightness is secured by using the materials of the electrode layers instead of a sealing material that is different in kind from the electrode layer materials, there is no occurrence of an unexpected reaction.

Besides, it is also conceivable to use an adhesive as a method for fixing the insulating frame and the current collecting plates. However, as described above, if a resin or the like different from the electrode materials contacts the electrode layers, there is a risk of causing an unexpected reaction. In this embodiment, since the current collecting plates are fixed to the insulating frame without using an adhesive that is different in kind from the electrode materials, the fixation between the insulating frame and the current collecting plates can be achieved while occurrence of an unexpected reaction is restrained.

Besides, as shown in FIG. 1, a portion of each current collecting plate is inserted in the insulating frame, and a portion thereof is protruded out of the insulating frame. Therefore, it is possible to easily attach a mechanism that extracts output from the cell, and therefore productivity improves. Besides, since the spaces between the insulating frame and the current collecting plates on both sides are filled with the electrode materials, this construction restrains the coming-apart of either current collecting plate.

Besides, the process of performing the pressing, and the process of forcing the materials of the electrode layers to get in between the insulating frame and the current collecting plates can be simultaneously performed, and therefore the production is easy. Besides, since the insulating frame can be held in a pressed state, the insulating frame and the current collecting plate can be fixed with an appropriate pressure applied thereto. Therefore, a solid lithium secondary cell with a reduced contact resistance can be produced.

Although in Embodiment 1, the sizes of the insulating frame and the current collecting plate are determined so that the difference between the inside diameter of the insulating frame and the outside diameter of the current collecting plates is 300 micrometers, this is not restrictive. It is appropriate to set the sizes of the insulating frame and the current collecting plates so that the materials of the electrode layers can get in between the insulating frame and the current collecting plates, and so that the current collecting plates can be held by the elastic force of the materials of the electrode layers. Concretely, the size of the gaps between the current collecting plates and the insulating frame may be in the range of 50 micrometers to 600 micrometers and, particularly, in the range of 100 micrometers to 600 micrometers. That is, the outside diameter of the current collecting plates may be smaller than the inside diameter of the insulating frame by a length of 100 micrometers to 1200 micrometers and, particularly, by a length of 200 micrometers to 1200 micrometers.

Incidentally, the easiness of the entrance of the materials of the electrode layers into the spaces between the insulating frame and the current collecting plates is considered to be dependent on the particle diameter of the materials. Therefore, the difference between the inside diameter of the insulating frame and the outside diameter of the current collecting plates may be determined on the basis of the particle diameter of the materials of the electrode layers. Concretely, the size of the gaps between the insulating frame and the side surfaces of the current collecting plates may be about 2 to 30 times the average particle diameter of the electrode layer materials (the difference in diameter between the insulating frame and the side surfaces of the current collecting plates may be about 4 to 60 times the average particle diameter). Depending on the production method for the electrode layer materials, particles whose diameters are larger than the average particle diameter can also exist in the materials. In such a case, the size of the gaps may be set on the basis of the maximum particle diameter of the material substances of the electrode layers. Concretely, the size of the gaps between the insulating frame and the side surfaces of the current collecting plates may be about 1 to 10 times the maximum particle diameter (the difference in diameter therebetween may be about 2 to 20 times the maximum particle diameter).

Although in Embodiment 1, the current collecting plates are held by the elastic force of the material substances of the electrode layers, this is not restrictive. It suffices that the current collecting plates are held or fixed by the insulating frame. For example, the current collecting plates may be held directly by the insulating frame. Concretely, the outside diameter of the current collecting plates may be substantially equal to the inside diameter of the insulating frame. Therefore, the current collecting plates can be held directly by the insulating frame, and air-tightness of the electrode layers can be secured. That is, from the view point of restraining the coming-apart of the current collecting plates or the like, it is appropriate that the current collecting plates be held directly or indirectly by the insulating frame.

Although in Embodiment 1, a tubular insulating frame having a circular cross-section is used, this is not restrictive. That is, it suffices that the insulating frame is constructed of an electrically insulating member, and has a shape that allows an electrolyte-electrode layered assembly to be formed in its interior, and that makes it possible to directly or indirectly hold the current collecting plate. For example, the insulating frame may have a shape of a hollow tube having a rectangular cross-section (square tube), or a tubular shape having a polygonal or elliptical cross-section. That is, in this application, the term "tubular" is not limited to a circular tubular shape.

Figure 8:
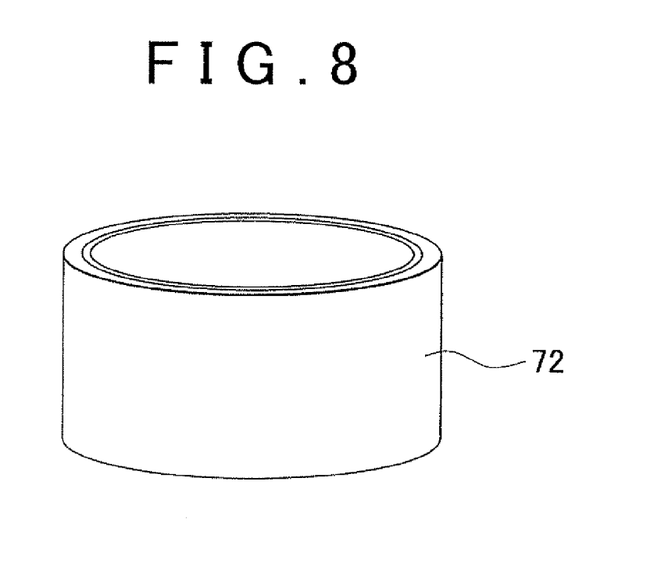
FIG. 8 is a perspective view of a modification of the solid cell of Embodiment 1.

Although in Embodiment 1, a portion of each current collecting plate is within the insulating frame and another portion thereof is outside the insulating frame, this is not restrictive. For example, a structure as shown in FIG. 8 in which the current collecting plates are provided within an insulating frame 72 is also permissible. In this structure, the coming-apart of the current collecting plates or the like can be restrained even in the case where a lateral force is applied to the cell. Besides, although in Embodiment 1, both the current collecting plates of the negative electrode and the positive electrode are held by the insulating frame, this is not restrictive. It is appropriate that the foregoing construction in which an insulating frame holds a current collecting plate be applied to at least one of the two current collecting plates. Therefore, for example, in a solid cell having a construction in which the electrode layer of the negative electrode serves also as a current collecting plate of the negative electrode, it is appropriate to apply the invention to the side of the positive electrode.

Embodiment 1 uses $LiCoO_2$ as a positive electrode active material, $70Li_2S$-$30P_2S_5$ as an electrolyte material, graphite as a negative electrode active material, and stainless steel as a current collecting plate. However, this is not restrictive. It is appropriate that the current collecting plate be made of an electrically conductive substance that provides such a strength that the current collecting plate can be held directly or indirectly by the insulating frame. For example, aluminum, nickel, copper, etc. may be used.

It suffices that the electrode active material and the electrolyte material allow a solid lithium secondary cell to be constructed. The positive electrode active material used herein may be, for example, $TiS_2$, $LiNiO_2$, etc. Besides, the negative electrode active material used herein may be, for example, Li metal, Li—Al alloy, Li—In alloy, etc. Besides, the electrolyte material used herein may also be solid electrolytes other than $70Li_2S$-$30$-$P_2S_5$, such as $Li_3PO_4$—$Li_2S$—$SiS_2$-based glass, a chalcogenite-based lithium ion conductor containing $Li_2O$, $Li_2SO_4$ and $Li_2CO_3$, a material containing lithium halide, and other oxide-based lithium ion conductors, etc.

Besides, the particle diameter of the electrode active material and the electrolyte material is not limited to the particle diameters mentioned above in conjunction with Embodiment 1, but it is appropriate that a particle diameter selected be suitably selected, from the view point of productivity.

Although in the production method of Embodiment 1, the definitive pressing is performed so that each current collecting plate moves 100 micrometers, this is not restrictive. It is appropriate to determine an amount of movement of the current collecting plates such that the materials of the electrode layer are forced into the gaps to such a degree that the current collecting plates can be held by the elastic force of the materials of the electrode layers. Incidentally, from the view point of holding the current collecting plates by the elastic force of the materials of the electrode layers, it is also appropriate that the moving distance of each current collecting plate relative to the insulating frame be equal to or greater than one-fifth of the thickness of the current collecting plates, and be less than or equal to the thickness of the current collecting plates. Specifically, it is appropriate to determine the tentative pressing pressure and the definitive pressing pressure so that the moving distance of the each current collecting plate relative to the insulating frame is equal to or greater than one-fifth of the thickness of each current collecting plate, and is less than or equal to the thickness of each current collecting plate.

Besides, although in the production method of Embodiment 1, the tentative pressing is performed, this is not restrictive. Specifically, a feature of this production method is that materials constituting the electrode layers are forced to get in between the insulating frame and outer peripheries of the current collecting plates, and it suffices that the production method is able to achieve the foregoing operation and effect. That is, the tentative pressing may be omitted. Incidentally, since the tentative pressing fixes the materials of the electrode layers to some extent, the tentative pressing may also be performed from the viewpoint of productivity.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A solid lithium secondary cell comprising:
   an electrically insulating tubular insulating frame;
   a solid electrolyte layer formed within the insulating frame;
   an electrode layer that is layered on at least one of the surfaces of the solid electrolyte layer, and that is formed within the insulating frame; and
   a current-collecting member that is layered on the electrode layer, and that is held by the insulating frame, wherein
   the current-collecting member is disposed so that at least a portion of the current-collecting member is within the insulating frame;
   a powder of a material of the electrode layer that contacts the current-collecting member fills a space between the insulating frame and the outer peripheral side surface of the current-collecting member; and
   an outside diameter of the current-collecting member is smaller than an inside diameter of the insulating frame by a length ranging from 100 micrometers to 1200 micrometers.

2. The solid lithium secondary cell according to claim 1, wherein the electrode layer includes:
   a positive electrode layer that is layered on one of sides of the solid electrolyte layer within the insulating frame, and that is formed by compressing a powder; and
   a negative electrode layer that is layered on another side of the solid electrolyte layer within the insulating frame, and that is formed by compressing a powder, and wherein
   the current-collecting member includes:
   a positive electrode current-collecting member that is layered on the positive electrode layer, and that is held by the insulating frame; and
   a negative electrode current-collecting member that is layered on the negative electrode layer, and that is held by the insulating frame.

3. A production method for a solid lithium secondary cell that includes:
   an electrically insulating tubular insulating frame;
   a solid electrolyte layer formed within the insulating frame;
   an electrode layer that is layered on at least one of surfaces of the solid electrolyte layer, and that is formed within the insulating frame by pressing a powder of a material of the electrode layer; and
   a current-collecting member that is layered on the electrode layer, at least a portion of the current-collecting member being disposed within the insulating frame, the production method comprising
   pressing the material of the electrode layer by applying force to the current-collecting member, wherein
   when the material is pressed, pressing is performed so that the material of the electrode layer gets in between the insulating frame and an outer periphery of the current-collecting member as a layer of the powder of the material of the electrode layer plastically deforms; and
   an outside diameter of the current-collecting member is smaller than an inside diameter of the insulating frame by a length ranging from 100 micrometers to 1200 micrometers.

4. A production method according to claim 3, wherein the electrode layer includes:
   a positive electrode layer that is formed on one of sides of the solid electrolyte layer within the insulating frame; and
   a negative electrode layer that is formed on another side of the solid electrolyte layer within the insulating frame, and wherein
   the current-collecting member includes:
   a positive electrode current-collecting member that is layered on the positive electrode layer, and that is held by the insulating frame; and
   a negative electrode current-collecting member that is layered on the negative electrode layer, and that is held by the insulating frame.

5. A production method for a solid lithium secondary cell, comprising:
   making an electrolyte-electrode layered assembly that has a layered structure that includes an electrode layer, and a solid electrolyte layer, by placing a powder of a material of the electrode layer, and a powder of a material of the solid electrolyte layer, in an electrically insulating tubular insulating frame, and tentatively pressing the powder of the material of the electrode layer, and the powder of the material of the solid electrolyte layer;

layering the current-collecting member on the electrolyte-electrode layered assembly so that at least a portion of the current-collecting member is disposed within the insulating frame; and definitively pressing the electrolyte-electrode layered assembly on which the current-collecting member has been layered, in such a manner that the material of the electrode layer gets in between the insulating frame and an outer periphery of the current-collecting member as the electrode layer plastically deforms, wherein an outside diameter of the current-collecting member is smaller than an inside diameter of the insulating frame by a length ranging from 100 micrometers to 1200 micrometers.

6. A production method according to claim 5, wherein the electrode layer includes:

a positive electrode layer that is formed on one of sides of the solid electrolyte layer within the insulating frame; and a negative electrode layer that is formed on another side of the solid electrolyte layer within the insulating frame, and wherein the current-collecting member includes:

a positive electrode current-collecting member that is layered on the positive electrode layer, and that is held by the insulating frame; and a negative electrode current-collecting member that is layered on the negative electrode layer, and that is held by the insulating frame.

* * * * *